United States Patent [19]

Blume et al.

[11] Patent Number: 4,861,133
[45] Date of Patent: Aug. 29, 1989

[54] DEVICE FOR APPLYING A SPLICE PROTECTOR TO OPTICAL CONDUCTORS

[75] Inventors: Georg Blume; Dieter Bohmwetsch, both of Backnang; Fritz Eckardt, Oppenweiler, all of Fed. Rep. of Germany

[73] Assignee: ANT Nachrichtentechnik GmbH, Backnang, Fed. Rep. of Germany

[21] Appl. No.: 173,450

[22] Filed: Mar. 25, 1988

[30] Foreign Application Priority Data

Mar. 27, 1987 [DE] Fed. Rep. of Germany ....... 3710089

[51] Int. Cl.$^4$ ............................................. G02B 6/36
[52] U.S. Cl. .................................. 350/96.2; 350/96.21
[58] Field of Search .................. 350/96.2, 96.21, 96.22

[56] References Cited

U.S. PATENT DOCUMENTS

| | | | |
|---|---|---|---|
| 4,116,532 | 9/1978 | Hubbard et al. | 350/96.21 |
| 4,629,284 | 12/1986 | Malavieille | 350/96.21 |
| 4,730,892 | 3/1988 | Anderson et al. | 350/96.21 |

FOREIGN PATENT DOCUMENTS 0122169 10/1984 European Pat. Off. ........... 350/96.2

Primary Examiner—John D. Lee
Assistant Examiner—John Ngo
Attorney, Agent, or Firm—Spencer & Frank

[57] ABSTRACT

A device for attaching a splice protector to a splice provided between two conductors includes a base; a receiver mounted on the base for receiving the splice protector in an open state thereof; two backup members situated at each end of the receiver for supporting the two conductors while the splice extends between the splice protector positioned in the receiver. The backup members are movable in a direction perpendicular to their conductor-supporting faces. Pressing jaws, which are mounted on at least one of the backup members, are disposed bilaterally of the receiver. At least one of the pressing jaws is pivotally attached to the backup member for a pivotal motion towards and away from the other pressing jaw. There is provided a force-transmitting arrangement for applying to the pivotally attached pressing jaw a force component of an external force upon motion of the backup members towards the base for effecting a displacement of the pressing jaws towards one another to compress the splice protector about the splice.

6 Claims, 1 Drawing Sheet

4,861,133

DEVICE FOR APPLYING A SPLICE PROTECTOR TO OPTICAL CONDUCTORS

BACKGROUND OF THE INVENTION

The present invention relates to a device for applying a splice protector to spliced-together optical conductors, with the splice protector being composed of two plates between which the optical fiber splice is located.

A splice protector composed of two plates is disclosed in German Patent No. 3,313,014 and German Offenlegungsschrift (non-examined published application) No. 3,345,222. The splice protector described therein is formed of either two individual plates or two plates connected to one another along one of their longitudinal sides such that they can be folded toward one another.

SUMMARY OF THE INVENTION

It is an object of the present invention to provide a device for applying such splice protectors to spliced optical conductors with a simple manual operation.

This object and others to become apparent as the specification progresses are accomplished by the invention, according to which, briefly stated, a device for attaching a splice protector to an optical conductor splice between a pair of optical conductors includes a receiver for receiving and supporting the splice protector in an open condition thereof. Backup blocks are movably mounted in a vertical direction on a base adjacent each end of the receiver for supporting the spliced conductors and aligning the conductor splice within the splice protector. Pressing jaws are mounted on the backup blocks and positioned adjacent the longitudinal sides of the receiver. At least one of the pressing jaws is pivotally connected to the backup blocks. When the backup blocks are moved downwardly, the pressing jaws move downwardly also and a force-transmitting arrangement pivots at least one of the pressing jaws towards the other of the pressing jaws to compress the plates of the splice protector together about the conductor splice.

DESCRIPTION OF THE PREFERRED EMBODIMENT

Figure 1:
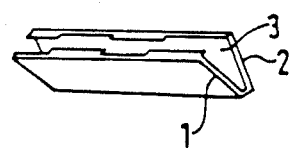
FIG. 1 is a perspective view of a known splice protector to be applied by a device according to the invention.

FIG. 1 shows a known splice protector composed of two plates 1 and 2 which are coated on their interiors with a permanently plastic adhesive material 3. In the illustrated embodiment, the two plates 1 and 2 are connected together at one of their longitudinal sides and may be folded together. Similarly, two plates not connected with one another can also be used as a splice protector.

After two optical conductors have been spliced in a splicer, the splice must be provided with mechanical protection. Therefore, the spliced-together optical conductors are placed between the two plates 1 and 2 shown in FIG. 1 and then both plates are pressed together retaining the optical conductor splice therein.

Figure 2:
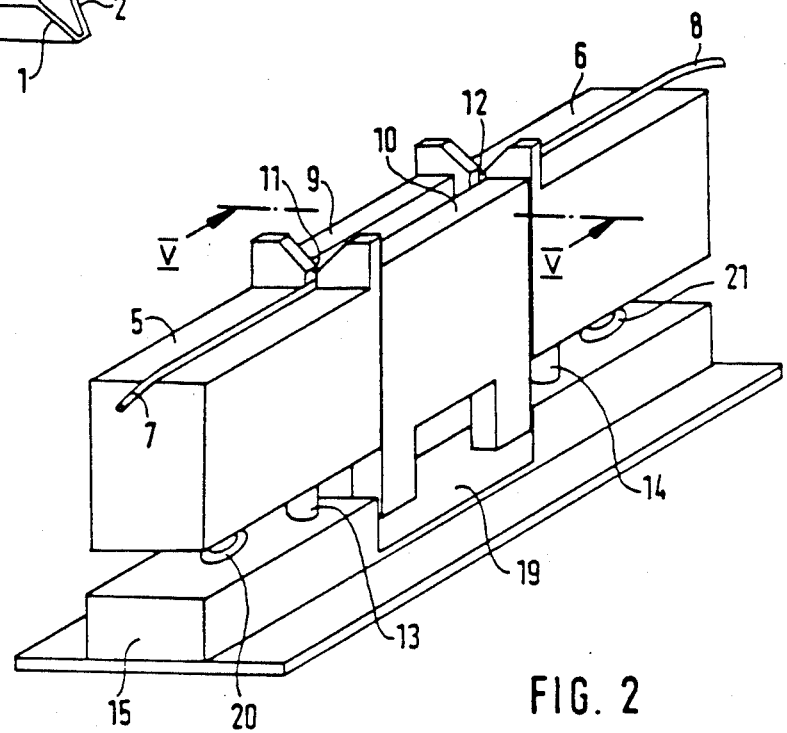
FIG. 2 is a perspective view of a device for applying a splice protector to an optical conductor splice according to a preferred embodiment of the invention.
Figure 3:
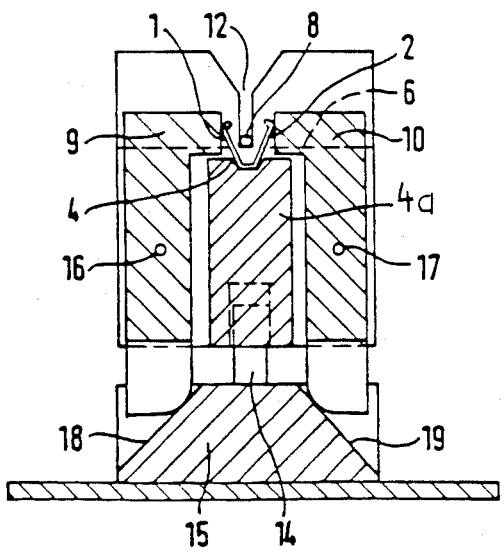
FIG. 3 is a sectional view along line V—V of FIG. 2.

A device for pressing together the plates 1 and 2 of the splice protector according to the invention to enclose and protect the splice of the optical conductors is shown in FIGS. 2 and 3. The device is essentially composed of a receiver block 4a having on its top a shallow receiving trough 4 of generally V-shaped cross section for supporting the splice protector, two backup blocks 5 and 6 for supporting the spliced optical conductors 7 and 8, disposed adjacent the frontal faces of the receiver 4 and two pressing jaws 9 and 10 disposed along the longitudinal sides of the receiver trough 4.

The spliced optical conductors 7 and 8 are manually gripped on both sides of the splice, are taken out of the splicer (not shown) and placed directly onto the two blocks 5 and 6. Guide grooves 11 and 12 provided on blocks 5 and 6 assure that the splice of the optical conductors 7 and 8, when the conductors are placed onto the blocks, is positioned properly between the folded-open plates 1 and 2 of the splice protector which has been placed into the receiving trough 4.

The blocks 5 and 6 are mounted so as to be displaceable perpendicular to their upper supporting planes. For this purpose, the blocks 5 and 6 are slidably mounted on guide pins 13 and 14 which are fastened to a base plate 15 and extend through bores formed in the blocks 5 and 6. The receiving block 4a is affixed to the blocks 5, 6 to move therewith as a unit.

Pressing jaws 9 and 10 are pivotally mounted between blocks 5 and 6, by shafts 16 and 17 extending parallel to the length of the trough 4 and to plates 1 and 2 disposed therein. Below each pressing jaw 9 and 10, base plate 15 is provided with outwardly and downwardly sloping faces 18 and 19 engaged by the lower end of the respective pressing jaws 9 and 10. When pressure is exerted on the blocks 5, 6 as the optical conductors 7 and 8 are placed thereon, causing the blocks 5 and 6 and the pressing jaws 9 and 10 to move downwardly toward base plate 15, the pressing jaws 9 and 10 which slide along slopes 18 and 19 are caused to pivot inward such that plates 1 and 2 inserted into trough 4 collapse toward one another, enclosing the optical conductor splice. When the pressure on the blocks 5 and 6 is released, the blocks 5 and 6, together with pressing jaws 9 and 10 return to their starting positions by way of compression springs 20 and 21 attached between the blocks and base plate 15. Subsequently, the optical conductor splice having the splice protector thereon may be removed from the device.

Alternatively, instead of providing two pivotal pressing jaws 9 and 10, the device may be equipped with one stationary pressing jaw and one pivotal pressing jaw.

The present disclosure relates to the subject matter disclosed in Federal Republic of Germany Application No. P 37 10 089.0 (filed March 27th, 1987), the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A device for attaching a splice protector to a splice provided between two conductors; said splice protector having two facing plates for accommodating the splice therebetween, comprising (a) a base;
(b) a receiving means mounted on said base for receiving the splice protector in an open state thereof, wherein the plates thereof are in a spread-apart position; said receiving means having a length dimension and opposite ends;
(c) two backup members situated at each end of said receiving means and having supporting faces for supporting the two conductors while the splice extends between the splice protector positioned in said receiving means;
(d) mounting means for holding said backup members on said base for motion relative to said base and in a direction perpendicular to said supporting faces;
(e) pressing jaws mounted on at least one of said backup members; said pressing jaws being disposed bilaterally of said receiving means relative to the length dimension thereof; at least one of said pressing jaws being pivotally attached to said one backup member for a pivotal motion towards and away from the other pressing jaw about an axis generally parallel to said length dimension; and
(f) force-transmitting means for applying to the pivotally attached pressing jaw a force component of an external force upon motion of said backup members towards said base in response to said external force for effecting a relative displacement of said pressing jaws towards one another to compress the plates of the splice protector toward one another about said splice.

2. A device as defined in claim 1, further comprising guide grooves disposed on said backup members adjacent each end of said receiving means for guiding said conductors and said splice between said plates of the splice protector.

3. A device as defined in claim 1, further comprising spring means for urging said backup members away from said base.

4. A device as defined in claim 1, wherein said force-transmitting means comprises
   (a) a surface provided on said base, said surface being oblique to said direction and extending laterally away from said receiving means; and
   (b) a portion forming part of said at least one pivoting jaw; said portion sliding on said surface during the motion of the backup members.

5. A device as defined in claim 4, wherein said base is provided with two of said surfaces and both said pressing jaws are pivotally connected to said backup members and pivot toward one another to compress said plates of said splice protector.

6. A device as defined in claim 1, wherein said receiving means includes a receiver block having a face and a receiving trough of generally V-shaped cross section formed in the face of the receiver block.

* * * * *